UNITED STATES PATENT OFFICE.

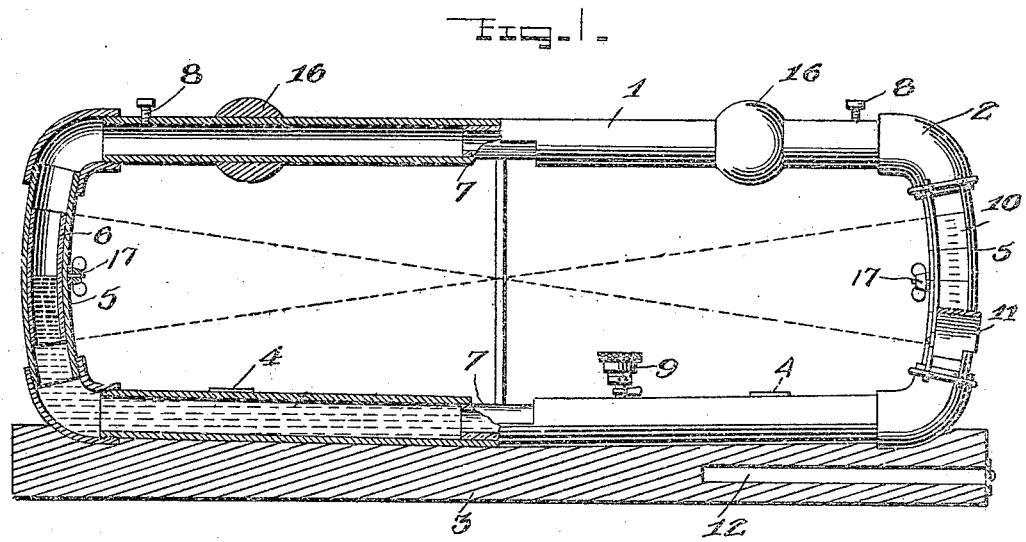
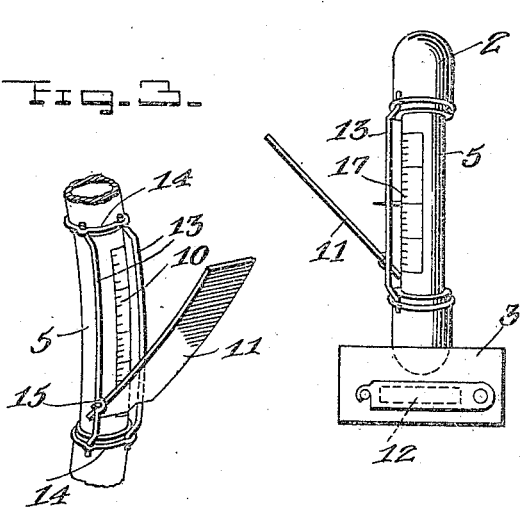
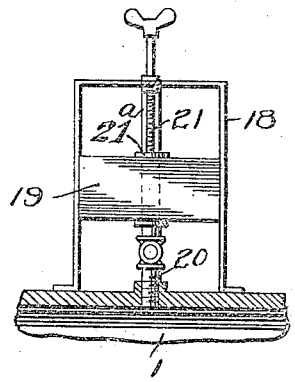

JOHN JAMES BUNTING, OF GRANDVIEW, WASHINGTON.

COMBINED LEVEL AND GRADIENT INSTRUMENT.

958,088.  Specification of Letters Patent.  Patented May 17, 1910.

Application filed January 17, 1910. Serial No. 538,559.

*To all whom it may concern:*

Be it known that I, JOHN JAMES BUNTING, a citizen of the United States, residing at Grandview, in the county of Yakima and State of Washington, have invented new and useful Improvements in Combined Level and Gradient Instruments, of which the following is a specification.

This invention relates to leveling and gradient instruments of that general class described in U. S. Letters Patent No. 936,407, issued to me on the 12th day of October, 1909, and contemplates equipping the instrument with reflectors by means of which the horizontal liquid level in the vertical tubes of the instrument may be viewed from directly above the instrument.

A further object of my present invention is to so construct the instrument that the liquid level will be maintained parallel with the minute division marks of the sight opening scale regardless of the slope of the instrument when set upon an inclined surface.

To attain these ends the invention embraces the structure hereinafter more fully described and claimed.

In the accompanying drawing Figure 1 is a side elevation of a leveling and gradient instrument constructed in accordance with my invention with parts in section and parts broken away. Fig. 2 is an end elevation of the instrument showing a reflector in applied position. Fig. 3 is a fragmentary perspective view of one of the tubes of the instrument equipped with a reflector. Fig. 4 is a modification of my fluid reservoir.

Referring now to the drawing in which like characters of reference designate similar parts in the views shown, the instrument is seen to consist of a substantially rectangular frame formed of tubes 1 joined together at their meeting ends by elbows 2. The rectangular frame is mounted in upright position upon a suitable base 3 and is rigidly secured thereto by straps 4 which pass over a long side of the frame and are terminally secured to the base in any preferred manner. The short sides 5 of the frame are formed of curved or bowed tubing and are partially cut away for a portion of their length to provide sight openings which are closed by glass tubes 6 curved about a common center and carried in the bores of the tubes 5. The long sides of the frame are also each partially cut away for a portion of their length to provide sight openings which are closed by straight glass tubes 7, the sight tubes of the long sides being preferably made less in length than the sight tubes of the short curved sides. Inlet openings 8 are formed in the upper long side through which liquid may be poured into the tubular frame until the latter is about half full when the inlet openings may be capped to prevent leakage or evaporation of the liquid. A reservoir 9 is tapped into the secured long side of the tubular frame and may be of any suitable construction. As shown, it operates somewhat in the manner of a hard lubricant cup to vary the liquid level in the frame and maintain the liquid level normally at the zero mark, of a curved graduated scale 10 which is arranged upon each curved sight tube and is preferably formed with graduations above and below the zero mark so as to enable accurate readings to be taken. When the instrument is placed upon an inclined surface the liquid rises in one of the sight tubes and sinks in the opposite one, thereby indicating upon the scale the number of degrees by which such surface varies from the horizontal.

In the event that I desire to use a heavier fluid such as mercury, I utilize the structure of apparatus shown in Fig. 4 which comprises a bracket 18 and a receptacle 19 having a yieldable top and bottom and connected at its bottom to the tube 1 by a pipe 20. An adjusting screw 21 is attached to the top of said receptacle and is threaded through said bracket 18 to regulate the flow of fluid from said receptacle. The lower end of the adjusting screw has a swivel connection 21ª to the top of the receptacle, and when the screw is raised the receptacle is expanded to withdraw a portion of the liquid from the tubular frame, and when the screw is moved downwardly the capacity of the receptacle is contracted and a portion of the liquid contained therein is forced into the tubular frame. By this means more or less liquid may be supplied to the tubular frame and the liquid therein may be maintained at the proper level and any inaccuracies may be easily corrected.

A peculiar advantage results from bowing outwardly the short tubes 5 in that first, a greater number of graduations may be placed upon a curved tube than with an approximately straight tube, and second the liquid level will be always parallel with one of the graduations of the scale whether the instrument be level or in an inclined position. Generally in the non-bowed or straight tubes hitherto constructed the liquid level inclines across the graduations when the instrument is tilted and prevents an accurate reading of the scale, which disadvantage is entirely obviated by the curved tubes of the present invention.

When the device is set in the position shown in Fig. 1, upon a floor or other low support, it is extremely difficult to obtain the reading from the sight tube scales. To overcome this disadvantage I provide a pair of reflectors 11 which may be formed of curved strips of polished metal or may be formed of mirrors of curvilinear outline to conform to the curvature of the axis of the sight tubes as clearly shown in Fig. 3. The reflectors are placed with their bottom edges in contact with the curved tubes 5 and are inclined laterally from the tubes to an angle of 45 degrees so that a person by looking down upon the reflector will see the image of the scale and liquid level in the polished face of the reflector. The operator is thus not forced to stoop to an uncomfortable position to obtain the reading from the scales as in leveling instruments as hitherto constructed.

The reflectors may be secured to the curved tubes 5 in any preferred manner, but I prefer to detachably mount the reflectors so that when not in use they may be stored in a convenient cavity 12 formed in the base of the instrument. To accomplish this fenders 13 are provided each being formed from a single length of wire in the general shape shown in Fig. 3. The extreme ends of each fender are engaged in suitable seats 14 arranged upon the tubes 5, a pair of fenders being disposed upon each tube and spaced a sufficient distance apart to receive the reflector plates 11. A recess or crimp 15 may be formed in one or both fenders to engage the lateral edges of the reflector and hold the same at the proper inclination to the curved tubes, as above described. Although the drawing shows the reflector provided with a marginal recess at one end to receive the shank of one fender, and a crimp in the other fender to engage the opposite lateral edge of the reflector, it is not intended to limit the construction of either the fenders or reflectors to the construction shown, as it is simply necessary to removably secure the reflector at an angle of approximately 45 degrees to the curved tubes 5 and any expedient and practical method of accomplishing this may be employed.

It has been found very advantageous to make the liquid-containing longitudinal portion of the tube bowed downwardly to a slight extent. This is for the purpose of clearing the said portion of the bubbles which would otherwise collect. It is shown in Fig. 1 that the base is grooved to accommodate this structure.

In order to prevent injury to the instrument in case of its being accidentally overturned buffers 16 are provided at various points along the frame. The buffers may be formed of any yielding material, and of any desired shape, the preferable construction being soft rubber balls or the like, as shown.

Secured to the curved tubes 5 at the zero mark of each sight tube scale is a needle 17 which is used in determining the elevations of distant objects as described in my former patent above referred to.

From the foregoing description taken in connection with the accompanying drawing it is thought that the construction and operation of my invention may be easily understood without a more extended explanation, it being understood that various changes may be made in the minor details of construction within the scope of the appended claims.

Reference is made to my patent above named for further description, this instrument being a facsimile of it except in the improvements set forth in the accompanying specification and claims.

Having thus described my invention, what I claim as new and desire to protect by Letters Patent is:

1. A clinometer comprising a substantially rectangular metallic frame having a cut-away portion, a sight glass arranged at the cut-away portion, said clinometer being provided at the sight glass with graduations, spaced fenders arranged at the sight glass and mounted on the metal frame at the ends of the cut-away portion, and a reflector mounted on the fenders.

2. A clinometer comprising a substantially rectangular metallic frame having a cut-away portion, a sight glass arranged at the cut-away portion, said clinometer being provided at the sight glass with graduations, spaced fenders arranged at the sight glass and mounted on the metal frame at the ends of the cut-away portion, a reflector detachably mounted on the fenders, and a base supporting the frame and having a cavity of a size to receive the reflector when the same is detached from the fender.

3. A clinometer comprising a substantially rectangular frame including opposite sight glass tubes curved about a common center and having graduations, and reflectors each arranged at an angle to one of the curved sight glass tubes and curved to conform to the curvature of the axis of the same.

4. A clinometer comprising a substantially rectangular tubular frame including sight glasses curved about a common center and having graduations and located at the ends of the frame, curved fenders spaced apart at the sight glasses and secured to the said frame, and curved reflectors mounted on the fenders and conforming to the curvature of the sight glasses.

5. A clinometer comprising a continuous tube in the shape of a rectangle, sight glasses located at various points on said rectangular tube and curved about a common center, buffers located upon the upper portion of said tube, a liquid column partially filling said tube, means for adjusting the height of the liquid in said tube, curved members connecting the upper and lower portions of said tube, said curved members being provided with reflectors, disposed at an angle thereto.

In testimony whereof I have hereunto set my hand in presence of two subscribing witnesses.

JOHN JAMES BUNTING.

Witnesses:
W. J. EARNEST,
F. S. BOYLES.